United States Patent [19]

Clausen et al.

[11] 4,286,624

[45] Sep. 1, 1981

[54] FLUID HANDLING SYSTEMS & MULTI-POSITIONABLE VALVING ARRANGEMENTS FOR THE USE THEREIN

[76] Inventors: Eivind Clausen, 2614 Kentucky St.; Benton H. Amos, 2427 Vista Dr.; William M. Wood, 231 N. State St., all of Bellingham, Wash. 98225

[21] Appl. No.: 124,070

[22] Filed: Feb. 25, 1980

[51] Int. Cl.³ .................... F16K 11/02; F16K 11/20
[52] U.S. Cl. .................... 137/625.19; 137/625.29; 137/625.46; 137/255; 180/314
[58] Field of Search ............... 137/625.18, 625.19, 137/625.29, 625.46, 255, 267; 244/135 R, 135 C; 180/314

[56] References Cited

U.S. PATENT DOCUMENTS

| | | | |
|---|---|---|---|
| 2,332,882 | 10/1943 | Ambatiello | 137/625.29 X |
| 2,356,786 | 8/1944 | Harman et al. | 244/135 X |
| 2,608,988 | 9/1952 | Ziegler | 137/267 X |
| 3,131,706 | 5/1964 | Harban | 137/625.19 X |
| 3,279,522 | 10/1966 | Norris et al. | 244/135 R |
| 3,288,238 | 11/1966 | Lindsey | 180/314 |
| 3,796,232 | 3/1974 | Dalton | 137/625.46 |

*Primary Examiner*—William R. Cline
*Attorney, Agent, or Firm*—Hughes, Barnard & Cassidy

[57] ABSTRACT

A compact fluid handling system and multi-positionable valving arrangement for use therein wherein a plurality of fluid source means such, for example, as a plurality of fuel tanks or the like, are adapted to be interconnected with a plurality of fluid utilization means such, for example, as a plurality of diesel engines or the like, in such a manner that fluid contained in a selected one or ones of the plurality of fluid source means can be directed to all or selected ones of the plurality of fluid utilization means, and wherein excess fluid which is unused by the fluid utilization means can be returned to the particular source means from which it was supplied or, in certain instances, can be returned to fluid source means other than that from which it was supplied. Various embodiments of the invention are illustrated and described, generally in connection with a fluid control valve system of the type having one or more disk-type control elements, wherein the system might be employed on marine vessels or the like where the invention finds particularly advantageous, but not necessarily exclusive, use. More particularly, the invention pertains to improved, compact valving arrangements which permit establishment of simple, yet highly effective, seals in multi-port valves suitable for use in such systems. In the various embodiments illustrated it is possible to incorporate both the fuel delivery and fuel return functions in a single valve or two identical valves.

23 Claims, 17 Drawing Figures

FLUID HANDLING SYSTEMS & MULTI-POSITIONABLE VALVING ARRANGEMENTS FOR THE USE THEREIN

RELATED APPLICATIONS

This application is related to the copending U.S. Pat. application of Benton H. Amos and William M. Wood, Ser. No. 40,145, filed May 18, 1979, for "Multi-positioned Valve", now abandoned in favor of copending U.S. continuation-in-part application Ser. No. 124,069, filed Feb. 25, 1980, for "Fluid Handling Systems and Multi-positionable Valving Arrangements For Use Therein."

BACKGROUND OF THE INVENTION

The present invention relates in general to multi-positionable valving arrangements for use in fluid handling systems; and, more particularly, to valving systems of the type used to control the supply of fluid from a selectible one or ones of n (where n is any whole integer greater than "1") fluid source means—e.g., n fuel tanks—to all or a selected one or ones of m (where m is any whole integer greater than "1") fluid utilization means—e.g., m diesel engines or the like—and, for returning the excess or unused fluid supplied to the m utilization means to a selected one or ones of the n fluid source means. When the present invention is used to control the supply of fuel from one of n fuel tanks to all or selected ones of m engines, the excess unused, or unburned, fuel supplied is commonly returned to the particular one of the n tanks from which it was supplied; but, in its broader aspects, the invention permits of return of excess unused fluid to a different selected tank or tanks in those instances where desirable.

While those skilled in the art will appreciate as the ensuing description proceeds that the present invention will find use in a wide range of fluid handling systems wherein there is a requirement to deliver fluid from a selected one or ones of a plurality of sources to all or a selected one or ones of a plurality of discrete utilization points, and to return excess or unused fluid from the plurality of discrete utilization points to a specific one or ones of the sources, the invention finds particularly advantageous use in those areas where a plurality of diesel fuel powered engines are utilized to provide motive power for, for example, marine vessels such as ships having multiple engines, large fishing or pleasure boats, tractor-trailer rigs hauling freight over highways, farm implements, passenger cars, and numerous industrial and/or process control applications.

Thus, it will be appreciated that the typical two-stroke diesel engine is an internal combustion power unit in which the heat of fuel is converted into work in the cylinder of the engine. In the diesel engine, air alone is compressed in the cylinder and, after the air has been compressed, a charge of diesel fuel is sprayed into the cylinder and ignition is accomplished by the heat of compression. Shortly before the piston reaches its highest position within the cylinder, the required amount of diesel fuel is sprayed into the combustion chamber by a fuel injector. The intense heat generated during compression of the air ignites the atomized fuel immediately. Because of the intense heat at or near the fuel injector, diesel engines may be portions of the diesel fuel itself to cool the fuel injector since, as fuel temprature increases, the performance of the engine is adversely affected. Surplus fuel which is used as a cooling agent is then returned to the fuel tank for subsequent use either as a cooling agent or as the source of motive power. Therefore, fuel lines and valving arrangements must be provided which serve not only to direct diesel fuel from the fuel tanks to the engines but, also, which serve to return unused fuel from the engines to the fuel tanks.

In many applications such, for example, as commercial fishing vessels or large pleasure boats, multiple fuel tanks may be utilized in conjunction with two or more engines. Such engines may function either as a source of motive power for the vessel or, alternatively, they may comprise one or more auxilliary engines which are utilized for purposes other than providing motive power for the vessel itself. Typically, all motive power engines and, perhaps one or more of the auxilliary engines as well, will be operating simultaneously and will be fed from the same fuel tank. As a particular fuel tank approaches or becomes empty, fuel must be directed to the engines from a second fuel tank. This process may be repeated a number of times depending upon the number of fuel tanks to be utilized.

So far as applicants are aware, most conventional prior art fuel delivery systems require individual valves for controlling the fuel being delivered to each engine and the fuel returning from each engine. That is, in a system employing two tanks and two engines, four valves would normally be required—viz., a first valve for delivering fuel from tank No. 1 to both engines; a second valve for delivering fuel from No. 2 to both engines; and, third and fourth valves for returning unburned fuel to tank Nos. 1 and 2, respectively. The number of valves required is, of course, magnified where more than two tanks and/or engines are used. Because the valves associated with each fuel supply and fuel return line for each tank are typically arranged in close proximity to one another in order to reduce the time required to close one tank and open another tank, it is not an uncommon occurrence for one to activate the incorrect valves and, therefore, disrupt the flow of fuel to the engines. Alternatively, one may inadvertently close the valves associated with the nearly empty tank before opening the valves associated with the new tank. In either case, if the fuel lines to the engines are run dry, air will enter the lines and the engines will have to be primed in order to be restarted—a difficult and cumbersome process.

Other problems associated with multiple fuel tanks in a marine situation or with other moveable vehicles having multiple fuel tanks, involve the waste, potential environmental damage, and hazards resulting from spillage of fuel. For example, fishing vessels typically have at least two fuel tanks—one on either side of the hull—with a balancing line connecting the lower portions of the fuel tanks and which serves to maintain approximately equal fuel levels in each tank for purposes of balance. The tanks are also provided with an overflow port on an upper portion of the tank. Therefore, if a vessel having dual fuel tanks which are substantially full lists to one side for whatever reason (such as wind blowing broadside to the vessel), fuel will flow from the upper windward tank to the lower fuel tank through the balancing line; and, since the lower fuel tank is already full, fuel will be spilled through the overload port into the water. By the same token, a diesel powered truck having full fuel tanks and resting sidewise on a slope would experience the same problem. In either case, not only is there a substantial hazard due to the spilled fuel, but the environmental damage and economic waste is obvious.

In addition to the problems associated with known prior art designs, a typical vessel with two engines and four fuel tanks would have at least eight valves and more than thirty fittings. The costs of providing this large number of valves and fittings in a competitive situation are enormous.

The foregoing problems have, to a large degree, been resolved by the systems heretofore disclosed and claimed in the aforesaid copending application of Benton H. Amos and William M. Wood, U.S. Ser. No. 40,145, filed May 18, 1979, now abandoned in favor of the aforesaid copending continuation-in-part application Ser. No. 124,069, filed Feb. 25, 1980. However, while the valving arrangements disclosed in such applications have proven to be quite effective, they tend to be relatively large and often require somewhat complex and/or expensive sealing arrangements. The present invention overcomes such problems and provides all of the advantages of the systems disclosed and claimed in such copending applications in a valve system characterized by its compactness and the ease with which effective, highly reliable, seals can be established.

The most pertinent prior art of which applicants are presently aware is that disclosed in Suddard U.S. Pat. No. 1,282,650 and in Baity U.S. Pat. No. 3,590,872. Thus, Studdard discloses a valve permitting unidirectional fluid movement between two object points. More specifically, Studdard discloses an elongated tapering rotary valve within a casing which may be moved between one of three positions. The rotary valve is provided with apertures or ports for communication with lines affixed to the casing. In a first position, all of the ports in the valve are closed except a single port which permits the flow of gasoline from a gasoline tank to an internal combustion engine. By rotating the valve member, the flow of gasoline is stopped and kerosene and water are permitted to flow through the valve to the engine, while exhaust gases will pass through the casing and valve to a muffler. In its third position, the valve closes all ports except one which permits the withdrawal of kerosene from the engine carburetor and its return to the kerosene tank. Baity U.S. Pat. No. 3,590,872 simply discloses a disk-type unidirectional valve in which fluid from a single source may be delivered to single point or to one of two points.

Other prior art which has come to the attention of applicants includes the following: Ross et al U.S. Pat. No. 796,252 which discloses a conventional mixing faucet wherein two different liquids are mixed and discharged from a common outlet; Meldau U.S. Pat. No. 876,724 which discloses a stop-cock valve for permitting introduction of compressed air into beer kegs; Strother U.S. Pat. No. 1,501,146 which discloses a valve of the type used with an air brake for automobiles; Turak U.S. Pat. Nos. 2,733,730 and 2,733,731 which disclose a flow-controlled unidirectional dispensing valve used to mix soft drink syrups with carbonated water; Johnson U.S. Pat. No. 2,908,293 which discloses a unidirectional valve in which fluid is supplied through a single inlet and discharged through a selected one or ones of three discharge outlets and/or a bypass outlet; Sanders U.S. Pat. No. 3,319,531 which discloses an integrating valve for delivering hydraulic fluid under pressure to a plurality of cylinders in selected exact quantities; and, Okadi U.S. Pat. No. 3,734,409 which discloses a mixing valve for mixing cold water and steam in a mixing chamber at given rates and delivering the hot water produced through a single outlet.

Because of the significant costs involved in providing the number of valves necessary in fuel supply systems heretofore in use, and because of the safety and environmental hazards incident to their use, there is, and has been, a continuing urgent requirement that a valving system—especially, a valving system-suitable for use with fuel handling systems—be provided which eliminates not only a large number of valves and fittings, but, which is also compact, easily sealed, and which reduces the change of spillage of fuel or other fluids and/or the need to prime engines which have had their fuel supply cut off due to an inadvertent mistake by the operator.

SUMMARY OF THE INVENTION

Accordingly, it is a general aim of the present invention to provide an improved valving system characterized by its compactness, ease of operation, effectiveness and versatility, and which overcomes all of the foregoing disadvantages inherent in the prior art.

In one of its more detailed aspects, it is an object of the invention to provide an improved compact valving arrangement in which the operator may readily, and virtually instantaneously, alter the operating condition of the fluid handling system so as to permit transfer of fluids from a different source or sources to a plurality of utilization means when the first source(s) is(are) depleted by the simple expedient of shifting only a single or, at most two, valve selector(s) from one position to another and wherein such action serves to simultaneously shut down supply of fluid from the depleted source and open up one or more new fluid sources for supplying fluid without disrupting fluid supplied to the plurality of utilization means and, at the same time, to permit return of unused or excess fluid from the utilization means to a selected one or ones of the fluid source(s) for subsequent use.

It is a further and more detailed objective of the invention to provide compact multi-port control valves characterized by their versatility and which are suitable for controlling the flow of fluids from and/or to one or more of a plurality of fluid sources to and/or from all or selected ones of a plurality of utilization points; yet, which permits ease of establishment of effective reliable seals and wherein the particular combination of operatively connected fluid inlet and outlet ports may be selectively altered on virtually an instantaneous basis without disrupting fluid flow to, or from, the operative utilization means.

An ancillary objective of the invention is to because of their versatility and simplicity of construction, permit a significant reduction in the number of valves permit a significant reduction in the number of valves and fittings heretofore required when dealing with fluid flow from selected ones of a plurality of sources to all or selected ones of a plurality of utilization points and return of excess or unused fluids to selected ones of the fluid sources, thereby providing significant cost reductions for the users of such systems.

DESCRIPTION OF THE DRAWINGS

These and other objects and advantages of the present invention will become more readily apparent upon reading the following detailed description and upon reference to the attached drawings, in which:

FIG. 1 is a schematic view illustrating in diagrammatic fashion a fluid handling and valving system embodying features of the present invention—the system here being shown by way of example as a fuel system for supplying fuel to a pair of engines which may, merely by way of example, comprise diesels engines as might be used in a boat, other marine vessel, or the like;

FIG. 2 is an exploded perspective view here illustrating the relationship of the various components of the exemplary valve shown in FIG. 1;

FIG. 3 is a perspective view of the exemplary valve shown in FIGS. 1 and 2 with the valve here being assembled;

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

DETAILED DESCRIPTION

Figures 1, 2, 3:
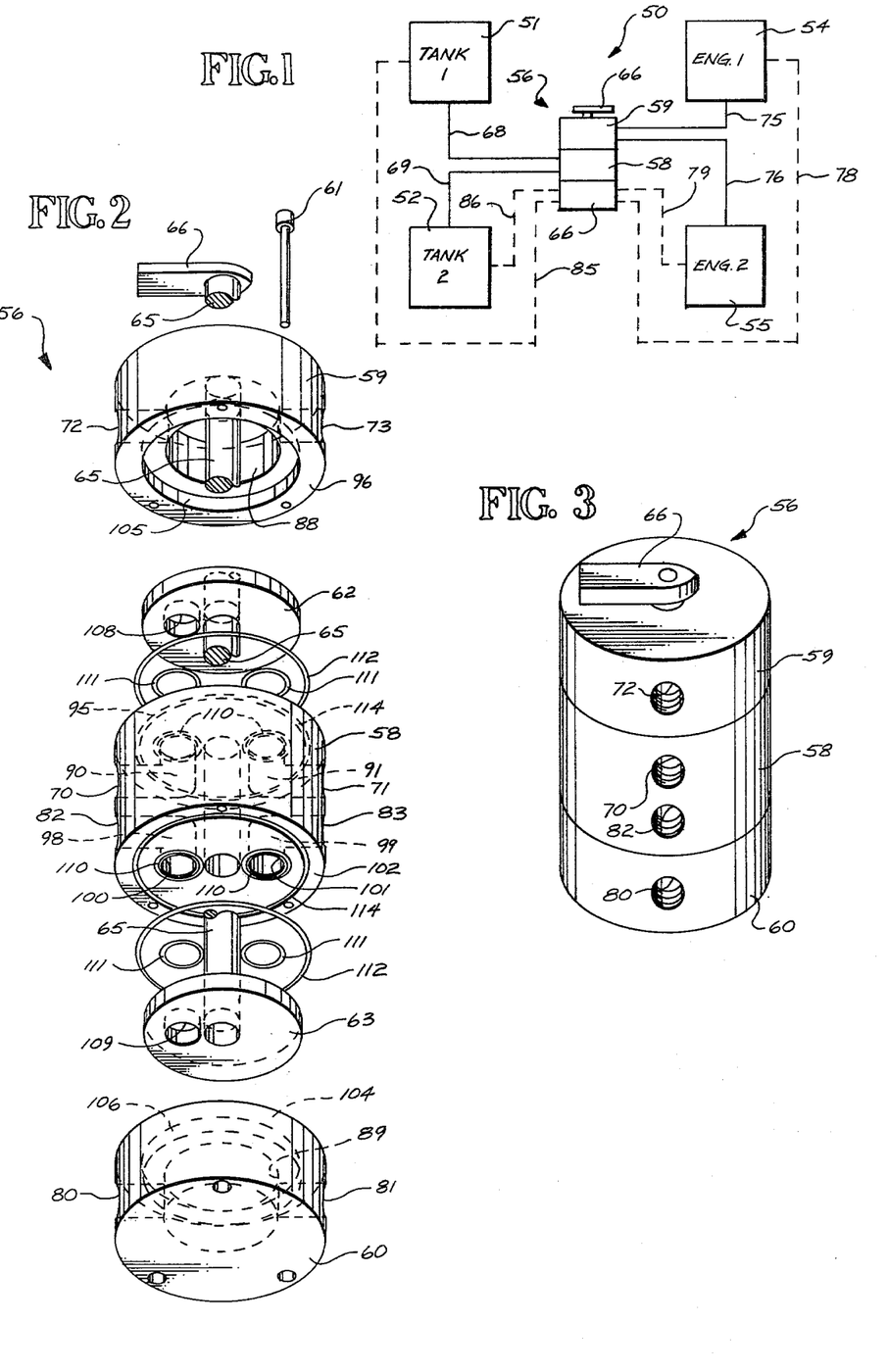

Referring to FIG. 1, there has been diagrammatically illustrated a fluid handling system, generally indicated at 50, incorporating a valving arrangement embodying features of the present invention—the exemplary system 50 here comprising a fuel supply system of the type commonly employed for supplying fuel from one of n fuel tanks 51, 52 to all of m engines 54, 55 (here, both n and m are equal to "2"), and for returning the unburned fuel from both engines 54, 55 to the particular tank 51, 52 which supplied such fuel. As here shown, the exemplary system 50 includes a fuel distributing valve, generally indicated at 56, having a housing defined by a first body portion 58 and x second body portions 59, 60 adapted to be secured in end-to-end, coaxial, abutting relation with the opposite ends of first body portion 58 by means of a plurality of threaded fasteners or the like, one of which is depicted in FIG. 2 at 61. In the exemplary valve 56 illustrated in FIGS. 1-7, two second body portions 59, 60 are provided which are respectively secured to opposite ends of the central body portion 58—viz., x is equal to "2"—but, as the ensuing description proceeds, those skilled in the art will appreciate that the fluid supply and return functions of the system can, if desired, be incorporated in separate fluid supply and fluid return valves and, in that event, valves constructed in accordance with the invention might conceivably employ a first body portion 58 and only one second body portion—viz., portion 59 or portion 60. That is, in such latter case, x would be equal to "1".

In the illustrative form of the invention shown in FIGS. 1 through 7, the valve 56 is provided with a pair of disk-type valve control elements 62, 63 which are splined or otherwise affixed to an operating shaft 65 extending axially through the valve housing defined by body portions 58-60 and having a handle or operating control lever 66 affixed to its upper end. The arrangement is such that when the valve 56 is employed, for example, as part of a fuel supply system, fuel is delivered from a selected one of tanks 51, 52 via fuel supply lines 68, 69, respectively (FIG. 1), to respective ones of a pair of fuel source supply inlet ports 70, 71 (best illustrated in FIGS. 2, 6 and 7) formed in the first or central body portion 58 of the valve 56. Fuel is delivered to the engines 54, 55 from a pair of fuel utilization supply outlet ports 72, 73 (FIGS. 2, 5 and 7) formed in body portion 59 via fuel supply lines 75, 76, respectively (FIG. 1).

To permit return of the unburned fuel from the engines 54, 55, the engines are respectively coupled via fuel return lines 78, 79 (FIG. 1) to a pair of fuel utilization return inlet ports 80, 81 formed in housing body portion 60 and which are adapted to be operatively connected to one of a pair of fuel source return outlet ports 82, 83 formed in central body portion 58 for return via one of fuel return lines 85, 86 to the particular one of fuel tanks 51, 52 which supplied such fuel initially. As best illustrated by reference to FIGS. 2 and 7 conjointly, it will be noted that the fuel utilization supply outlet ports 72, 73 are interconnected by means of a supply plenum chamber 88 formed in housing body portion 59; while fuel utilization return inlet ports 80, 81 are similarly interconnected by means of a return plenum chamber 89 formed in body portion 60.

Figures 4, 5, 6, 7:
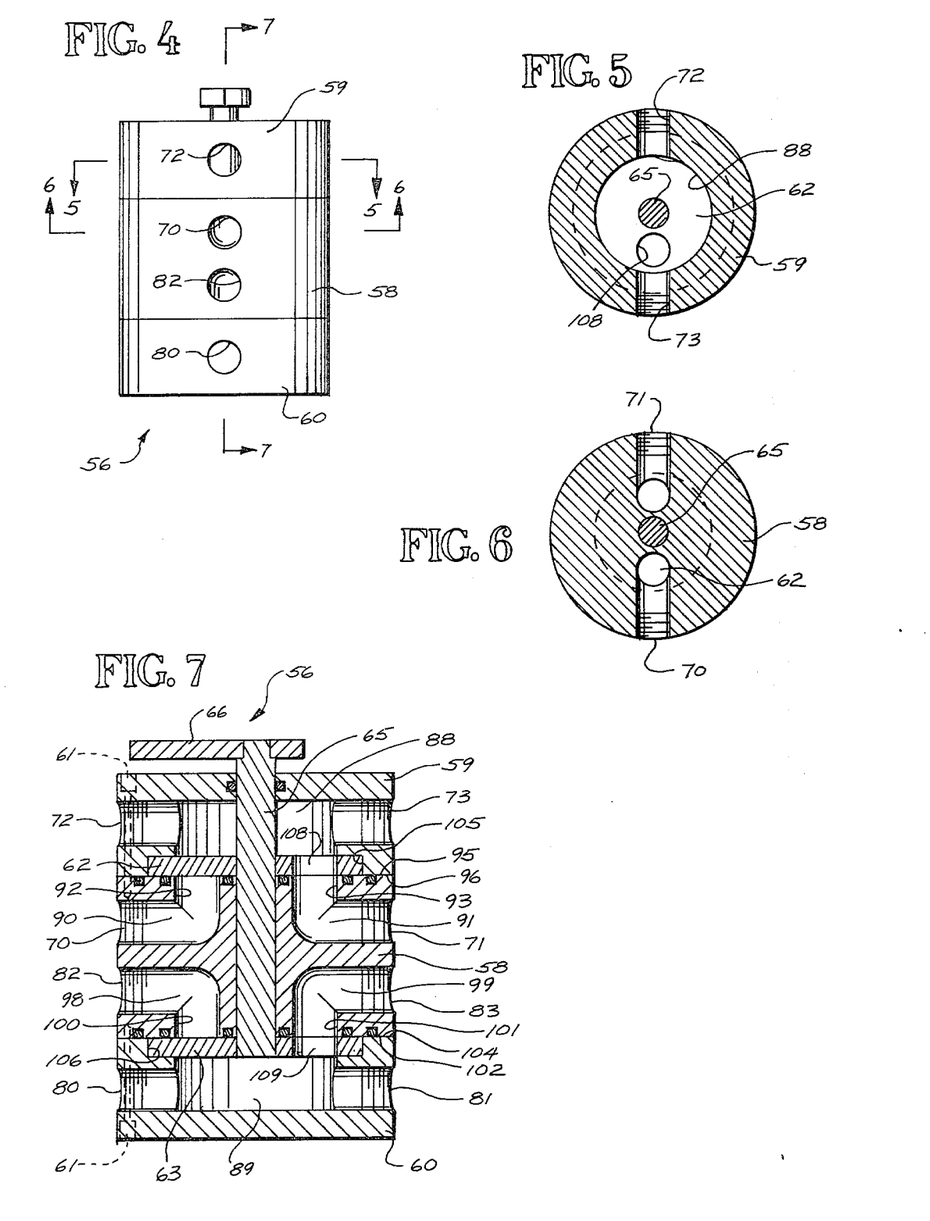
FIG. 4 is a side elevational view of the valve shown in FIGS. 1-3.
FIGS. 5 and 6 are cross-sectional views taken substantially along the lines 5—5 and 6—6, respectively, in FIG. 4.
FIG. 7 is a vertical sectional view of the valve shown in FIGS. 1-4, here taken substantially along the line 7—7 in FIG. 4.

In accordance with one of the important aspects of the present invention, provision is made for selectively transferring the fluid supply and the fluid return functions from one to the other of the fuel tanks 51, 52 when, for example, the fuel stored in one tank is depleted and the tank in use is approaching the empty condition; and, wherein such transfer occurs without disruption of the fuel supply to engines 54, 55. To accomplish this, provision is made for establishing fluid flow paths interconnecting a selected one of supply inlet ports 70, 71 with supply plenum chamber 88 (and, therefore, with both supply outlet ports 72, 73) and for interconnecting return plenum chamber 89 (and, therefore, both return inlet ports 80, 81) with a selected one of return outlet ports 82, 83. To this end, supply inlet ports 70, 71 are respectively connected with a pair of L-shaped fluid flow paths 90, 91 having longitudinally extending passageway means 92, 93 equi-distant from the axis of body portion 68 and terminating in the end wall 95 thereof which is adapted to be mounted in end-to-end abutting relation with the facing end wall 96 on second body portion 59 by means of threaded fasteners 61 or the like. Similarly, return outlet ports 82, 83 are respectively connected with a second pair of L-shaped fluid flow paths 98, 99 defining longitudinally extending passageway means 100, 101 equi-distant from the axis of body portion 58 and terminating in the opposite end wall 102 which is adapted to be engaged in end-to-end abutting relation with the facing end wall 104 on the other second body portion 60.

In carrying out the present invention, and to permit only a selected one of the fuel tanks 51, 52 (FIG. 1) to be operatively connected to both engines 54, 55, provision is made for selectively connecting only one of the L-shaped fluid supply paths 90, 91 with supply plenum chamber 88 (and, therefore, with both supply outlet ports 72, 73) and for selectively connecting only one of the L-shaped fluid return paths 98, 99 to return plenum chamber 89 (and, therefore, with both return inlet ports 80, 81). To this end, the disk-type valve control elements 62, 63 are respectively positioned within recesses 105, 106 formed in respective ones of the end walls 96, 104 of second body portions 59, 60 and are received therein with freedom for controlled rotation upon actuation of the operating handle or control lever 66. The exemplary control disk 62 is here depicted as including an axially extending flow passage 108 extending entirely therethrough and positioned therein for selective alignment in fluid communicating registration with one or the other of the longitudinally extending fluid supply passageways 92, 93 in first body portion 58. That is, and as best illustrated by reference to FIGS. 1 and 7 conjointly, when control element 62 is in the position shown in FIG. 7, fluid passage 108 formed therein is aligned with longitudinal passageway 93 and, consequently, tank 52 is operatively connected in fluid supplying relation with both engines 54, 55 via supply line 69, inlet port 71 and L-shaped passageway 91 in body portion 58, passage 108 in control element 62, supply plenum chamber 88 and outlet ports 72, 73 in second body portion 59, and supply lines 75, 76. At the same time, the disk-type control element 62 serves to effectively block fluid flow from tank 51 to both engines since L-shaped supply passage 90 is operatively disconnected from the supply plenum chamber 88.

In similar fashion, disk-type control element 63 serves to control return of unburned fuel from both engines 54, 55 to a selected one of tanks 51, 52—here, tank 52 which is functioning as the operative fuel supply tank. Thus, unburned fuel is returned via return lines 78, 79 (FIG. 1), inlet ports 80, 81 and return plenum chamber 89 in body portion 60, and an axially extending through-passage 109 formed in control element 63 which, in the position shown in FIG. 7, is aligned with longitudinal passageway 101 in body portion 58 and, therefore, with tank 52 via L-shaped passageway 99, return outlet port 83, and return line 85. The arrangement is such that when the operator desires to switch the fuel supply and return functions from tank 52 to tank 51, it is merely necessary to rotate operating control lever 66 so as to simultaneously shift the control elements 62, 63 from the positions shown in FIG. 7 to positions where the control element flow paths 108, 109 are respectively aligned with L-shaped passages 90 and 98 in body portion 58, thereby operatively connecting both engines 54, 55 with tank 51 and operatively disconnecting both engines from tank 52.

To insure effective and reliable seals between the various components of the exemplary valve 56, a plurality of conventional O-ring seals are employed. For example, the end walls 95, 102 of the central body portion 58 are each provided with a pair of annular grooves 110 (most clearly illustrated in FIG. 2) in surrounding relation to the longitudinally extending flow passageway means 92, 93 and 100, 101 with such grooves being adapted to receive suitable O-ring seals 111 which are in face-to-face wiping contact with the disk-type control elements 62, 63, thereby preventing leakage of fluid radially through the interface between the control disks and the end walls 95, 102 of body portion 58. A further relatively large O-ring seal 112 is mounted in a third annular groove 114 formed in each end wall 95, 102 of body portion 58 so as to provide a seal preventing leakage of fluid through the respective interfaces between the first body portion 58 and the second body portions 59, 60 in end-to-end abutting relationship therewith.

Thus, those skilled in the art will appreciate that the exemplary multi-port valve system hereinabove described in connection with FIGS. 1-7 readily permits of the supply of fluid from any one of n fluid sources—here, the n fluid sources are, for example, two fuel tanks 51, 52—to m utilization devices—here, the m utilization devices comprise two engines 54, 55—with return of unburned fuel from both engines to the supplying tank. However, the present invention is not restricted to an arrangement wherein unused fluid—e.g., unburned fuel—is returned to the supplying source but, rather, the invention in its broader aspects permits of return of unutilized fluid to any of the n sources irrespective of which source is operatively supplying fluid at any particular point in time.

Figure 8:
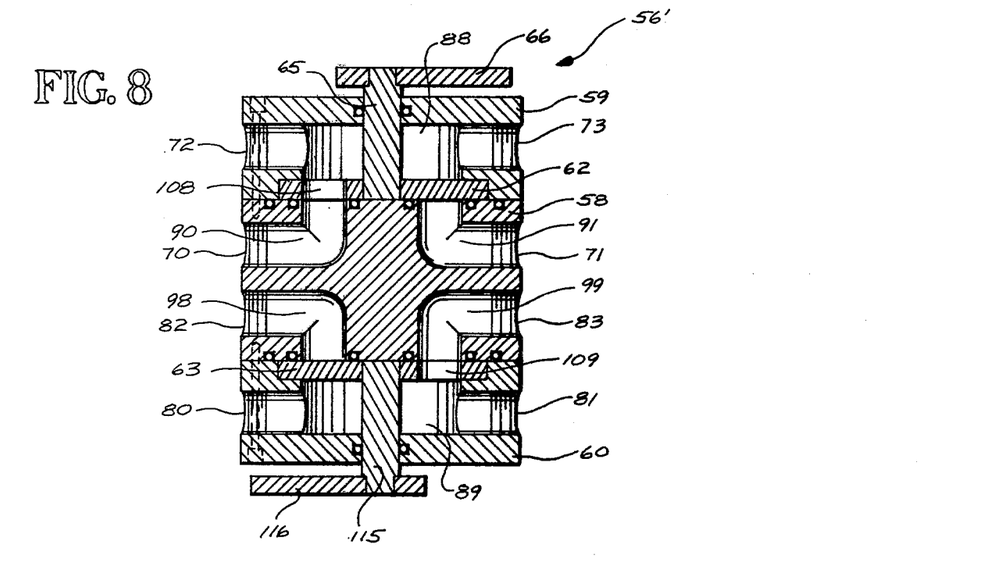
FIG. 8 is a vertical sectional view similar to FIG. 7, but here illustrating a slightly modified form of the invention.

Thus, referring to FIG. 8 there has been illustrated a slightly modified multi-port valve 56' which is substantially identical in all respects to the valve depicted in FIG. 7 except that in this instance only disk-type control element 62 is secured to control shaft 65 and is selectively positionable by means of the operating control lever 66. In the return portion of the valve, control disk 63 is secured to control shaft 115 extending through body portion 60 and having its own operating control lever 116 mounted thereon. Thus, in the position shown in FIG. 8, fluid is received through inlet port 70 and passes through L-shaped passageway 90 and flow path 108 in control element 62 into the supply plenum chamber 88, from which point the fluid is supplied to all utilization points via outlet ports 72, 73. Assuming that inlet port 70 is operatively associated with tank 51 (FIG. 1) as was the case in the form of the invention described in connection with FIG. 7, then fuel is being supplied from tank 51 to both engines 54 and 55; whereas fuel from tank 52 is precluded from passing through passageway 91 into supply plenum chamber 88 because of control element 62. Similarly, unburned fuel from the engines 54, 55 is here returned to valve 56' via return inlet ports 80, 81 and return plenum chamber 89. Such unburned fuel is here free to pass through flow path 109 in control element 63 and, in the position shown in FIG. 8, such unburned fuel passes outwardly through L-shaped passage 99 and outlet port 83 which is operatively connected to tank 52 (FIG. 1) by means of return line 86. Consequently, in the position depicted, fuel is supplied to both engines 54, 55 from tank 51, while unburned fuel is returned from both engines to tank 52. Because the two control disks 62, 63 are each provided with their own independently positionable operating lever 66, 116, respectively, the operator may adjust the valve 56' to supply fuel to both engines from either tank and to return unburned fuel from both engines to either the supplying tank or to the other tank.

Figure 9:
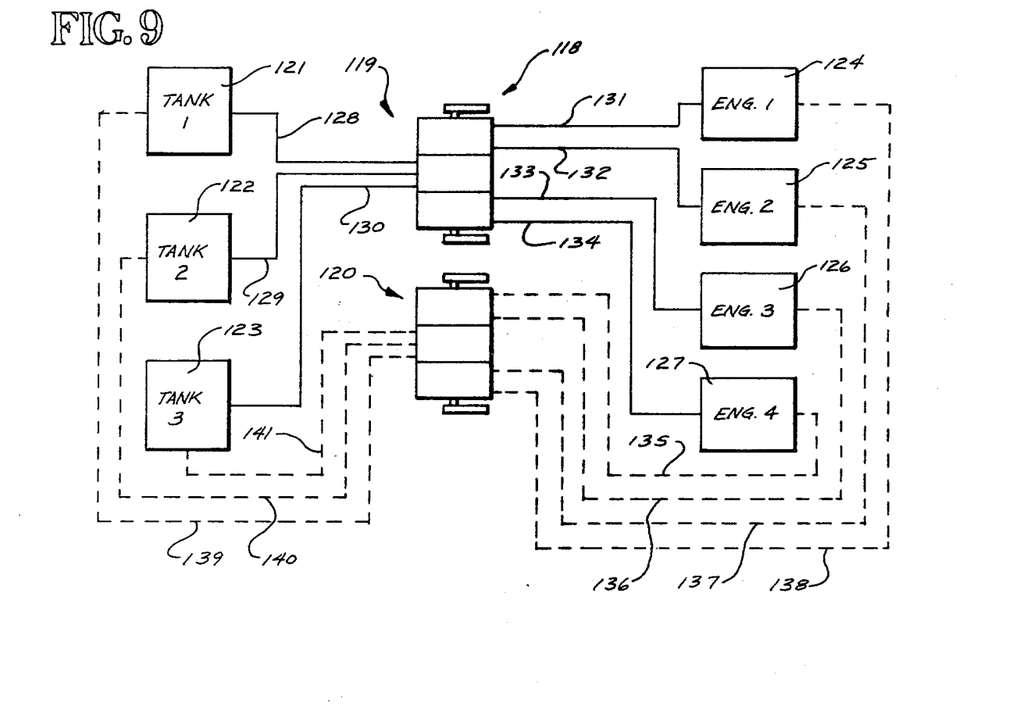
FIG. 9 is a schematic view illustrating in diagrammatic fashion a modified fluid handling and valving system embodying features of the present invention—the exemplary system here shown being suitable for transferring fluids between selected ones of three fuel tanks and four engines.
Figure 10:
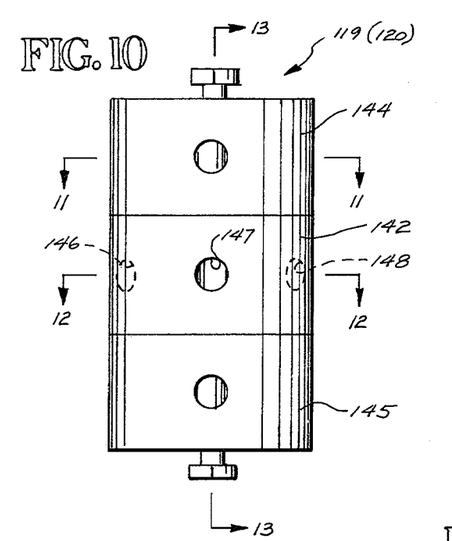
FIG. 10 is a side elevational view of one of the two identical valves shown by way of example in FIG. 9.
Figure 11:
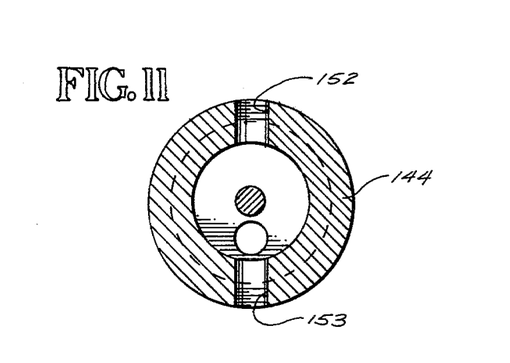
FIGS. 11 and 12 are cross-sectional views taken substantially along the lines 11—11 and 12—12, respectively, in FIG. 10.
Figure 12:
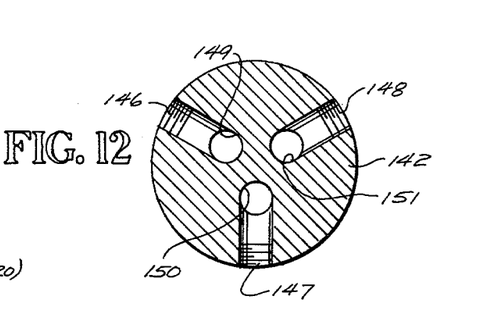

Referring next to FIG. 9, there has been illustrated a somewhat modified fluid handling system, generally indicated at 118, here incorporating a supply valve, generally indicated at 119, and a return valve, generally indicated at 120, which are identical in construction and which both embody the features of the present invention. As here depicted, the system permits fluid to be supplied from any one of n tanks 121, 122, 123 (i.e., n is equal to "3") to all of m engines 124, 125, 126, 127 (i.e., m is equal to "4") via a selected one of supply lines 128, 129, 130, supply valve 119, and all of supply lines 131, 132, 133, 134. Similarly, unburned fuel is returned from all engines 124-127 through return lines 135, 136, 137, 138, return valve 120, and a selected one of return lines 139, 140, 141 to one of the tanks 121-123.

Turning to FIGS. 10 through 13, one of the two identical valves shown in FIG. 9—viz., supply valve 119 and return valve 120—has been shown in greater detail. Since the two valves are identical in all respects, it should suffice to describe only one in detail; it being understood that such description is equally applicable to the other, except for the fact that those ports identified as inlet and outlet ports in one valve will respectively function as outlet and inlet ports in the other. Accordingly, the ensuing description will here refer, for example, to a valve functioning as supply valve 119.

In this exemplary form of the invention, the valve 119 is again provided with a first body portion 142 and x second body portions 144, 145 which are disposed in coaxial end-to-end abutting relation. In this form of the invention, the first body portion 142 is provided with three radial inlet ports 146, 147, 148 which are adapted to be connected to respective different ones of supply lines 128-130 (FIG. 9). As best illustrated by reference to FIGS. 12 and 13 conjointly, it will be noted that the radially disposed inlet ports 146-148 are coupled to respective different ones of three longitudinally extending fluid passageways 149, 150, 151 which are formed in, and extend entirely through, first body portion 142 with such passageways 149-151 being equi-distant from a vertical axis (as viewed in FIG. 13) passing through supply valve 119. Supply valve 119 is further provided with four radially disposed supply outlet ports 152, 153, 154, 155—outlet ports 152 and 153 being formed in body portion 144, while outlet ports 154 and 155 are formed in body portion 145. As here shown outlet ports 152, 153 are in fluid communication with a plenum chamber 156 formed in body portion 144, while outlet ports 154 and 155 are in fluid communication with a plenum chamber 158 formed in body portion 145.

Figure 13:
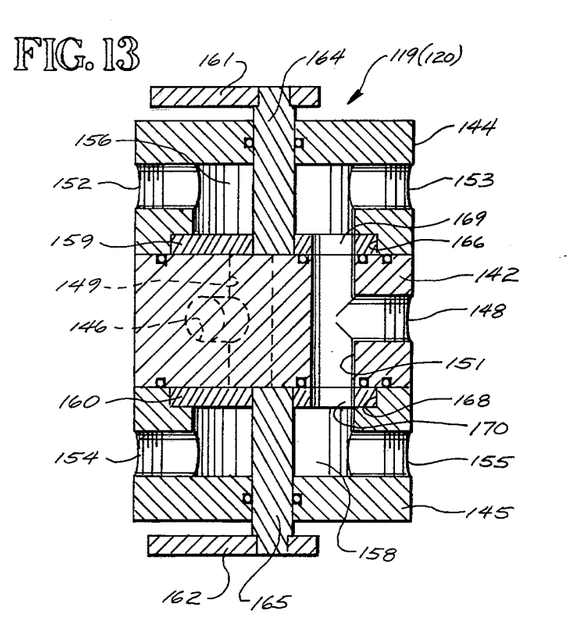
FIG. 13 is a vertical sectional view taken substantially along the line 13—13 in FIG. 10.

In keeping with the present invention, provision is made for selectively coupling each of the plenum chambers 156, 158 to a selectable one or ones of the inlet ports 146-148. To accomplish this, the valve 119 is provided with first and second disk-type control elements 159, 160 which are respectively coupled to independently actuable control levers 161, 162 by means of control shafts 164, 165 having their inner ends splined or otherwise affixed to respective different ones of the control disks 159, 160 and their outer ends affixed to respective different ones of the control levers 161, 162.

Control disks 159 and 160 are respectively mounted in recesses 166, 168 formed in the inboard ends of body portions 144 and 145; and, are further respectively provided with flow paths 169, 170 which are equi-distant from the axes of the control disks with the three longitudinal passages 149-151 formed in first body portions 142.

Thus, the arrangement is such that when the control levers 161, 162 are positioned as shown in FIG. 13, fluid supplied from tank 123 via supply line 130 (FIG. 9) is permitted to flow through inlet port 148 and longitudinal passage 151 in the first body portion 142 and, then through the flow paths 169, 170 respectively located in control elements 159, 160 which are in alignment with longtidutinal passage 151. Consequently, the fluid from tank 123 passes into both plenums 156 and 158, and outwardly therefrom through all outlet ports 152-155 to all engines 124-127. If, on the other hand, the operator desired to supply fuel from one tank—e.g., tank 123—to only two engines—e.g., engines 126, 127—it would simply be necessary to rotate control operating lever 161 so as to align the flow path 169 in control element 159 with a different one of the three longitudinally extending passages 149-151. For example, if control element 159 were rotated to align passage 169 therein with passage 149 in first body portion 142 (while leaving control element 160 in the position shown) the net result would be that fluid would be supplied from tank 121 to engines 124 and 125, while fluid would be supplied from tank 123 to engines 126 and 127. Such an arrangement is of particular value in, for example, a marine vessel employing multiple port and starboard engines and multiple fuel tanks.

Those skilled in the art will further appreciate that when the valve depicted in FIGS. 10 through 13 is used as a return valve 120 (FIG. 9), fluid flow therethrough will be in the opposite direction to that described above. Thus, with the valve 120 in the position shown in FIG. 13, ports 152-155 would function as return inlet ports, and unburned fuel from all four engines 124-127 would be returned through such inlet ports and through the aligned passages 151, 169, 170 so as to exit valve 120 through return outlet port 148 which is operatively connected to tank 123. As in the case of usage as a supply valve 119, when used as a return valve 120 the illustrative apparatus of FIGS. 10-13 permits return of unused fluid from all utilization means to a single source or, alternatively, from certain of the utilization means to one of a plurality of sources and from the remainder of the utilization means to a different one of the plurality of sources.

It will also be evident that, if desired, both disk-type control elements 159, 160 could be affixed to a command control shaft and operating lever in a manner similar to that depicted in FIG. 7. Thus, in such an arrangement, the two control elements would be moved in unison; and, where the two flow passages 169, 170 therein are disposed on a common longitudinal axis, all utilization means would be coupled to a common fluid source for both supply and return functions. Where the two flow passages 169, 170 are disposed on different longitudinal axes, two of the four utilization means would be coupled to one source, while the remaining two would be coupled to a different source.

Figure 14:
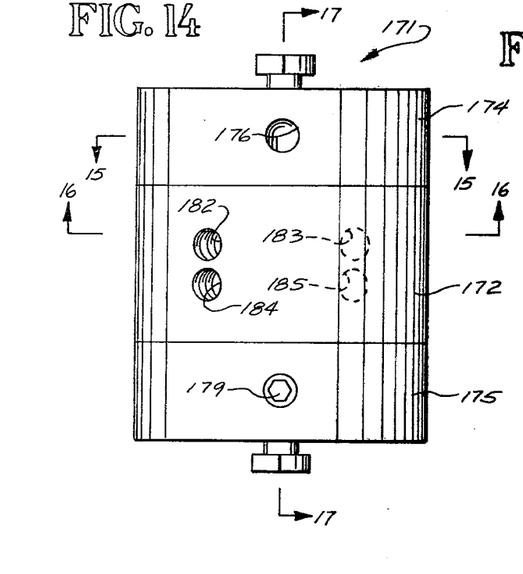
FIG. 14 is a side elevational view of yet another modified valve embodying features of the present invention.

Turning next to FIG. 14, there has been illustrated a further modified version of the invention which here employs a multi-port valve 171 which is similar to the valve heretofore described in FIGS. 9-13 in the sense that separate valves are provided for supply and return functions when transferring fluids between multiple fluid sources and multiple fluid utilization devices. In this form of the invention, the supply valve again permits transfer of fluids from any one source to all of a plurality of fluid utilization means or, alternatively, transfer of fluids from one source to certain only of m utilization means and from a different source to the remaining utilization means. Again, return of the unused fluid is permitted from all of the utilization means to any one source or, alternatively, from certain of the utilization means to one source and from the remaining utilization means to a different source. However, in this form of the invention, the first or central body portion is operatively connected to the plurality of utilization means and the x second body portions are operatively connected to the plurality of fuel sources—as contrasted with the preceding embodiment wherein the first or central body portion was connected to the plurality of fluid sources while the outer second body portions were connected to the plurality of utilization means.

Figure 15:
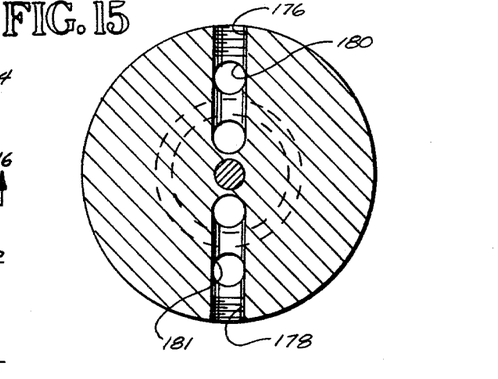
FIGS. 15 and 16 are cross-sectional views taken substantially along the lines 15—15 and 16—16, respectively, in FIG. 14; and, FIG. 17 is a vertical sectional view taken substantially along the line 17—17 in FIG. 14.
Figure 16:
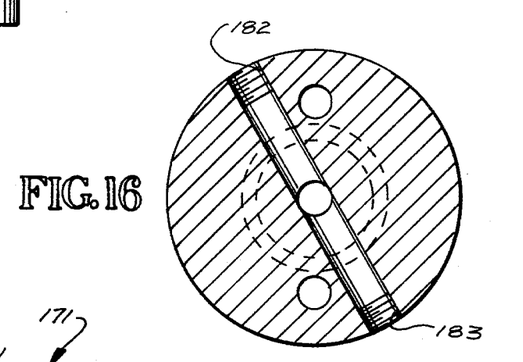

To this end, the exemplary valve 171 is provided with a first centrally disposed body portion 172 and a pair of co-axial second body portions 174, 175 which are respectively secured thereto in end-to-end abutting relation. As best illustrated by reference to FIGS. 14, 15 and 17 conjointly, it will be noted that body portion 174 is provided with a pair of diametrically opposed radial supply inlets 176, 178, while body portion 175 is provided with a similar set of supply inlet 176', 178'. However, in this instance supply inlets 176', 178' are preferably sealed by means of threaded plugs 179 which are affixed in the outer radial extremities of the two inlet ports. Inlet ports 176, 178 are respectively interconnected to the radial inner extremities of inlet ports 176', 178' by means of a pair of longitudinally extending fluid passageways 180, 181 which are formed in, and extend entirely through, body portion 172 and which partially extend through body portions 174 and 175—viz., the longitudinal passageways 180, 181 intersect, and terminate at, respective ones of the inlet port pairs 176, 176' and 178, 178'.

Figure 17:
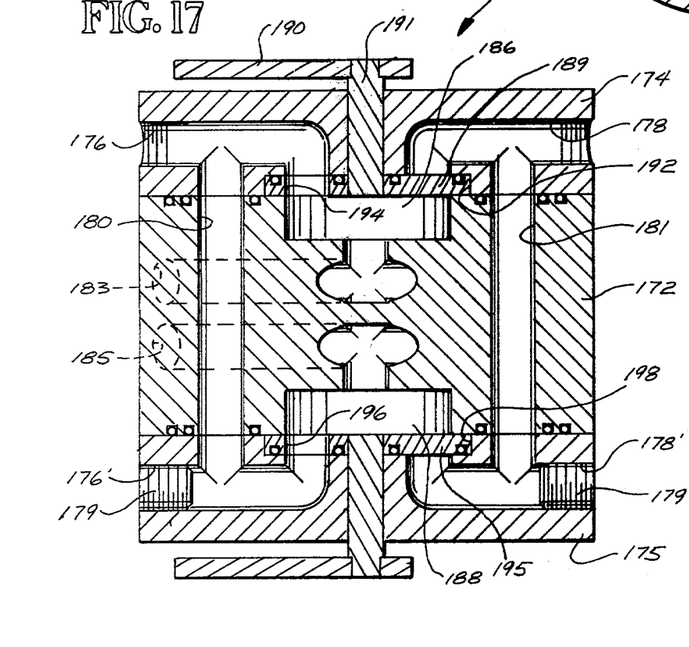

In keeping with this form of the invention, body portion 172 is provided with four radial outlet ports 182, 183 and 184, 185. Ports 182 and 183 are interconnected to a first plenum chamber 186 formed in the upper portion of body portion 172, while ports 184 and 185 are interconnected to a second plenum chamber 188 formed in the lower portion of the central body portion 172. A disk-type control element 189 coupled to an operating control lever 190 by means of a control shaft 191 is mounted in a recess 192 formed in body portion 174 and is provided with a flow passage 194 which can be selectively aligned with one of the fluid inlets 176, 178 for coupling plenum chamber 186 (and therefore, outlet ports 182, 183) to a selected one of the inlet ports 176, 178. A second disk-type control element 195 having a flow path 196 formed therein is positioned in a recess 198 formed in body portion 175 and is operatively connected to a control operating lever 199 by means of a control shaft 200; thereby enabling coupling of plenum chamber 188 (and, therefore, outlet ports 184, 185) with either of inlet ports 176, 178.

In operation, and considering, for example, the valve's control operating levers 190, 199 to be positioned as shown in FIG. 17, fluid supply to inlet port 178 is effectively precluded from reaching either plenum chamber 186 or plenum chamber 188 because of control elements 189 and 195, respectively. Fluid entering inlet port 176 passes directly to plenum chamber 186 through flow path 194 in control element 189 and, at the same time, passes through passage 180 in body portions 172, 174 and 175 to the inner radial extremity of inlet port 176' and, from there through flow path 196 in control element 195 to plenum chamber 188 and outlet ports 184, 185. Consequently, in this position, fluid is supplied from a single source coupled to inlet port 176 to four utilization points via four outlet ports 182–185. If desired, one may adjust the operating control levers 190, 199 so as to deliver fluid from one inlet port 176 to two outlet ports, and from the other inlet port 178 to two other outlet ports. For example, assuming that control element 189 is left in the position shown in FIG. 17, while control element 195 is rotated so as to align the flow path 196 therein with the radial inner extremity of inlet port 178', then fluid will continue to be delivered from inlet port 176 through flow path 194 and plenum chamber 186 to outlet ports 182, 183. However, such fluid will be precluded from reaching plenum chamber 188 because of the change to position of control element 195. Fluid is now permitted to pass from inlet port 178 through flow passage 181 and the radial inner extremity of inlet port 178' to plenum chamber 188 (and therefore, to outlet ports 184, 185) since flow passage 196 in control element 195 is now aligned with the radial inner extremity of inlet port 178'. Thus, the valve depicted in FIGS. 14–17 permits the flow of fluid from either of two sources to all of four utilization means or, alternatively, from one of two sources to two of four utilization means and from the other of two sources to the remaining two of the four utilization means. And, of course, it will be readily understood that the valve 171 depicted in FIGS. 14–17 can also be utilized as a return valve. In this instance, ports 176, 178 function as return outlet ports, while ports 182–185 function as return inlet ports.

Thus, there have herein been described various forms of fluid handling and valving systems which are highly versatile and characterized by their ability to deliver fluid from one of a plurality of sources to all of a plurality of utilization points or, alternatively, from one of a plurality of sources to some of a plurality of utilization points and from another of a plurality of sources to the remainder of the plurality of utilization points; while, at the same time, permitting return of unused fluid from all of the utilization points to one of the sources (which may be either the supplying source or a different source) or, alternatively, from some of a plurality of utilization points to one of a plurality of sources and from the remainder of a plurality of utilization points to a different fluid source. Moreover, those skilled in the art will appreciate that the number of n sources and m utilization means may be varied widely to accommodate the particular operating parameters desired. That is, n can be equal to, less than, or greater than m. Indeed, assuming, for example, that a given valve is provided with four inlet and four outlet ports, such valve can be adapted for operation with any number of sources from one to four and any number of utilization means from one to four by simply plugging any non-utilized port with a threaded plug such as shown at 179 in FIG. 17.

What is claimed is:

1. A fluid control valve system comprising, in combination:

(a) valve housing means: said valve housing means having a first and x (where "x" is any whole integer less than "3") second coaxial body portions secured together in end-to-end abutting relation; n (where "n" is any whole integer greater than "1") fluid source supply inlet ports and n fluid source return outlet ports formed in one of said first body portion and said x second body portion(s) and adapted to be operatively connected to respective different ones of n fluid source means; m (where "m" is only whole integer greater than "1") fluid utilization supply outlet ports and m fluid utilization return inlet ports formed in the other of said first body portion and said x second body portion(s) and adapted to be operatively connected to respective different ones of m fluid utilization means; longitudinally extending first passageway means formed in said one body portion(s) corresponding in number to, and respectively interconnected in fluid transmitting relationship with respective different ones of each of, said n fluid source supply inlet and return outlet ports; said first passageway means terminating in the end wall(s) of said one body portion(s) secured in end-to-end abutting relation to said other body portion(s) at points equi-distant from an axis extending longitudinally through said first and x second body portions; and, second passageway means formed in said other body portion(s) corresponding in number to, and respectively interconnected in fluid transmitting relationship with respective different ones of each of, said m fluid utilization supply outlet and return inlet ports;

(b) selectively positionable valve control element means mounted in said valve housing means: said valve control element means comprising x rotatable closure disk(s) respectively mounted between said first body portion and each of said x second body portion(s); at least one of said first body portion and said x second body portion(s) being recessed to receive said disk(s) while permitting said first and said x second body portions to be secured together in end-to-end abutting relation; means formed in one of said x disk(s) and said other body portion(s) for interconnecting all of said second passageway means with one another; and, longitudinally extending third passageway means formed in and extending through said x disk(s); said third passageway means being coupled in fluid transmitting relation with said means interconnecting all of said second passageway means and being equi-distant with said first passageway means from said axis so as to permit selective coupling of one of said first passageway means to all of said second passageway means whereby fluid paths are completed through said fluid control valve system from one of said n fluid source supply inlets to all of said m fluid utilization supply outlets and from all of said m fluid utilization return inlets to one of said n fluid source return outlets; and, (c) selector means coupled to said x disk(s) for rotating the latter so as to align said third passageway means with selected ones of said first passageway means whereby one of said n fluid source supply inlet ports is operatively connected to supply fluid to all of said m fluid utilization supply outlet ports and all of said m fluid utilization return inlet ports are operatively connected to return fluid to one of said n fluid source return outlet ports.

2. A fluid control valve system as set forth in claim 1 wherein n and m are equal.

3. A fluid control valve system as set forth in claim 1 wherein n is greater than m.

4. A fluid control valve system as set forth in claim 1 wherein m is greater than n.

5. A fluid control valve system as set forth in claim 1 wherein said selector means are adjustable so as to permit fluid flow from one of said n inlet ports to all of said m outlet ports.

6. A fluid control valve system as set forth in claim 1 wherein said selector means are adjustable so as to permit fluid flow from one of said n inlet ports to certain only of said m outlet ports, and from a different one of said inlet ports to the remainder of said m outlet ports.

7. A fluid control valve system as set forth in claims 5 or 6 wherein said selector means are adjustable so as to permit fluid from all of said m return inlet ports to one of said n return outlet ports.

8. A fluid control valve system as set forth in claims 5 or 6 wherein said selector means are adjustable so as to permit fluid flow from certain only of said m return inlet ports to one of said n return outlet ports, and from the remainder of said m return inlet ports to a different one of said n return outlet ports.

9. A fluid control valve system as set forth in claim 1 wherein said valve housing means comprises a first central body portion and two second body portions respectively affixed to said first central body portion at opposite ends thereof in end-to-end coaxial abutting relation; and, wherein a first of said x closure disks is mounted in a recess formed at the interface between said first body portion and one of said two second body portions, and a second of said x closure disks is mounted in a recess formed at the interface between said first body portion and the other of said two body portions.

10. A fluid control valve system as set forth in claim 9 wherein said selector means includes a single control operating lever operatively connected to both of said x closure disks for simultaneously rotating said disks in unison so as to permit selective coupling of one of said n supply inlet ports with all of said m supply outlet ports and all of said m return inlet ports with one of said n return outlet ports.

11. A fluid control valve system as set forth in claim 9 wherein said selector means includes first and second control operating levers operatively connected to respective different ones of said first and second closure disks so as to permit selective coupling of one of said n supply inlet ports with all of said m supply outlet ports and independent selective coupling of all of said m return inlet ports with one of said n return outlet ports.

12. A fluid control valve system as set forth in claims 10 or 11 wherein said n supply inlet ports, said n return outlet ports, and said longitudinally extending first passageway means are formed in said first central body portion; said m supply outlet ports are formed in the first of said two second body portions; said m return inlet ports are formed in the second of said two second body portions; said longitudinally extending passageway means includes n fluid supply passageways having parallel longitudinal portions equi-distant from the axis of said first body portion and positioned for selective alignment with said third passageway means in the first of said x closure disks so as to permit operative connection of one of said n inlet ports in said first body portion with all of said m outlet ports in the first of said two second body portions; and, said longitudinally extending passageway means includes n fluid return passageways having parallel longitudinal portions equi-distant from the axis of said first body portion and positioned for selective alignment with said third passageway means in the second of said x closure disks so as to permit operative connection of all of said m inlet ports in the second of said two second body portions with one of said n outlet ports in said first body portion.

13. A fluid control valve system as set forth in claim 1 wherein said valve housing means comprises a supply valve housing and a return valve housing and wherein each of said housings includes a first central body portion and two second body portions respectively affixed to said first central body portion at opposite ends thereof in end-to-end coaxial abutting relation; and, wherein a first of said x closure disks is mounted in a recess formed at the interface between said first body portion and one of said two second body portions, and a second of said x closure disks is mounted in a recess formed at the interface between said first body portion and the other of said two body portions.

14. A fluid control valve system as set forth in claim 13 wherein said n supply inlet ports are formed in said first central body portion of said supply valve, certain of said m supply outlet ports are formed in one of said second body portions of said supply valve, the remainder of said m supply outlet ports are formed in the other of said second body portions of said supply valve, certain of said m return inlets are formed in one of said second body portions of said return valve, the remainder of said m return inlets are formed in the other of said second body portions of said return valve, and said n return outlets are formed in said first central body portion of said return valve.

15. A fluid control valve system as set forth in claim 13 wherein said n supply inlet ports are formed in said two second body portions of said supply valve, said m supply outlet ports are formed in said first central body portion of said supply valve, said m return inlets are formed in said first central body portion of said return valve, and said n return outlets are formed in said two second body portions of said return valve.

16. A fluid control valve system as set forth in claims 14 or 15 wherein said selector means includes first and second control levers operatively connected to respective different ones of said first and second closure disks in said supply valve so as to permit independent positioning of said closure disks whereby fluid may be selectively supplied (i) from one of said n inlet ports to all of said m outlet ports and (ii) from one of said n inlet ports to certain only of said m outlet ports and from another of said n inlet ports to the remainder of said m outlet ports.

17. A fluid control valve system as set forth in claims 14 or 15 wherein said selector means includes first and second control levers operatively connected to respective different ones of said first and second closure disks in said return valve so as to permit independent positioning of said closure disks whereby fluid may be selectively returned (i) from all of said m inlet ports to one of said n outlet ports and (ii) from certain only of said m inlet ports to all of said n outlet ports and from the remainder of said m inlet ports to another of said n outlet ports.

18. A fluid control valve system as set forth in claims 14 or 15 wherein said selector means includes first and second control levers operatively connected to respective different ones of each of said first and second closure disks in said supply valve and third and fourth control levers operatively connected to respective different ones of each of said first and second closure disks in said return valve whereby fluid may be selectively supplied (i) from one of said n inlet ports to all of said m outlet ports and (ii) from one of said n inlet ports to certain only of said m outlet ports and from another of said n inlet ports to the remainder of said m outlet ports, and fluid may be selectively returned (iii) from all of said m inlet port to one of said n outlet ports and (iv) from certain only of said m inlet ports to one of said n outlet ports and from the remainder of said m inlet ports to another of said n outlet ports.

19. A fluid control valve comprising, in combination; first, second and third body portions secured together in end-to-end coaxial fluid-tight relation with said first body portion disposed between said second and third body portions; a plurality of parallel longitudinal passages formed in and extending from end-to-end through said first body portion with said passages being equi-distant from the axis of said first body portion; a plurality of radial ports formed in said first body portion corresponding in number to, and operatively connected in fluid transmitting relation with respective different ones of, said plurality of parallel longitudinal passages; a first recess formed in one of said first and second body portions at the interface therebetween; a second recess formed in one of said first and third body portions at the interface therebetween; first and second closure disks mounted in respective different ones of said first and second recesses with freedom for controlled rotation therein about an axis coincident with the axis of said first body portion; a longitudinal passageway formed in and extending through each of said closure disks and equi-distant from the axis thereof with said plurality of longitudinal passages in said first body portion; a plurality of passages formed in each of said second and third body portions and defining at least one flow passage extending in a longitudinal direction and equi-distant from an axis coincident with the axis of said first body portion; a plurality of fluid ports for connecting respective different ones of said passages in said second and third body portions with the exterior thereof; first plenum means in one of said first and second body portions for interconnecting all of said passages formed in said one of said first and second body portions; second plenum means in one of said first and third body portions for interconnecting all of said passage formed in said one of said first and third body portions; said first and second plenum means being in fluid transmitting registration with respective ones of the longitudinal passageways formed in said first and second closure disks; and means for rotating said first and second closure disks so as to align the longitudinal passageways therein with the plenum means at one radial face thereof and with one only of the longitudinal passages terminating at the opposite radial face thereof.

20. A fluid control valve as set forth in claim 19 wherein said first and second plenum chambers are formed in respective ones of said second and third body portions for interconnecting all of said ports and said passages in respective ones of said second and third body portions whereby upon selective rotation of said control disks by said rotating means a first fluid transmitting path is established between any one of said ports in said first body portion and all of said ports in said second body portion, and a second fluid transmitting path is established between any one of said ports in said first body portion and all of said ports in said third body portion.

21. A fluid control valve as set forth in claim 20 wherein said plurality of ports in said first body portion are adapted to be operatively associated with respective different ones of a like-numbered plurality of fluid sources, and said plurality of ports in said second and third body portions are adapted to be operatively associated with respective different ones of a like-numbered plurality of utilization means.

22. A fluid control valve asset forth in claim 21 wherein said valve comprises a supply valve for transmitting fluid from selected ones of the plurality of fluid sources to all of the fluid utilization means.

23. A fluid control valve as set forth in claim 21 wherein said valve comprises a return valve for transmitting fluid from all of the fluid utilization means to selected ones of the plurality of fluid sources.

* * * * *